United States Patent
Horsford et al.

[11] 3,809,000
[45] May 7, 1974

[54] PASSIVE ROLL STABILISERS

[75] Inventors: Anne Horsford, Twickenham; George Richard Grant Lewison, Kew Gardens; James Arthur Haines Paffett, Cobham, all of England

[73] Assignee: Secretary of State for Trade and Industry in Her Britannic Majesty's Government of the United Kingdom of Great Britain and Northern Ireland, London, England

[22] Filed: Aug. 4, 1971

[21] Appl. No.: 168,963

[52] U.S. Cl. ............................................. 114/124
[51] Int. Cl. ........................................... B63b 39/02
[58] Field of Search ............. 114/122, 124; 244/93; 46/241; 193/35 A; 188/317

[56] References Cited
UNITED STATES PATENTS
2,892,482  6/1959  Beoletto ............................. 188/317
3,557,735  1/1971  Dreyfus .............................. 114/124
3,466,796  9/1969  Greenblatt .......................... 46/241

FOREIGN PATENTS OR APPLICATIONS
388,275  8/1908  France ................................. 114/124
4,838  11/1908  Great Britain .................... 114/124

Primary Examiner—Duane A. Reger
Assistant Examiner—Galen L. Barefoot
Attorney, Agent, or Firm—Cameron, Kerkam & Sutton

[57] ABSTRACT

A passive roll stabiliser for floating vessels particularly small craft where a mobile body undergoes tuned damped oscillatory motion along an arcuate guide-way when the vessel rolls. The body is subject to the effects of rotational and translational inertias such that the rotational energy is at least half its translational energy. This increases the oscillatory period of the body and enables the guide-way to be curved sufficiently to ensure an adequate static stability for the vessel. The body is preferably a rolling body whose motion is damped by a fluid-like substance which slips or tumbles in a chamber within the body as it rolls.

13 Claims, 5 Drawing Figures

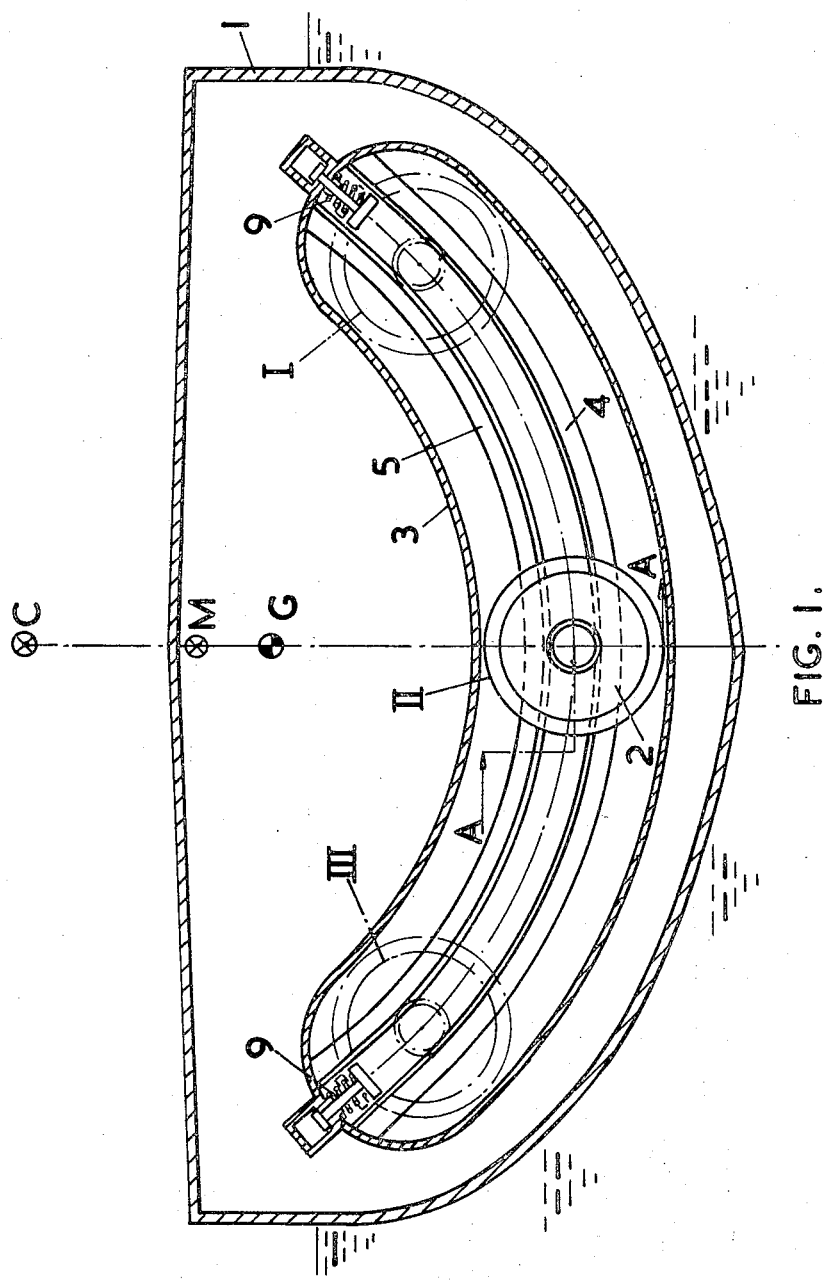

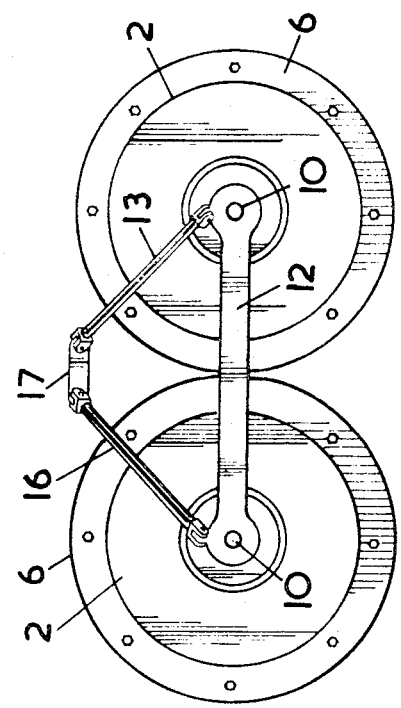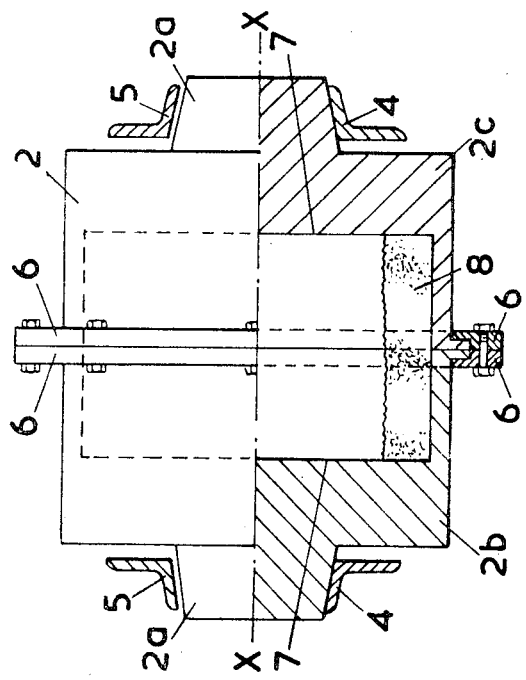

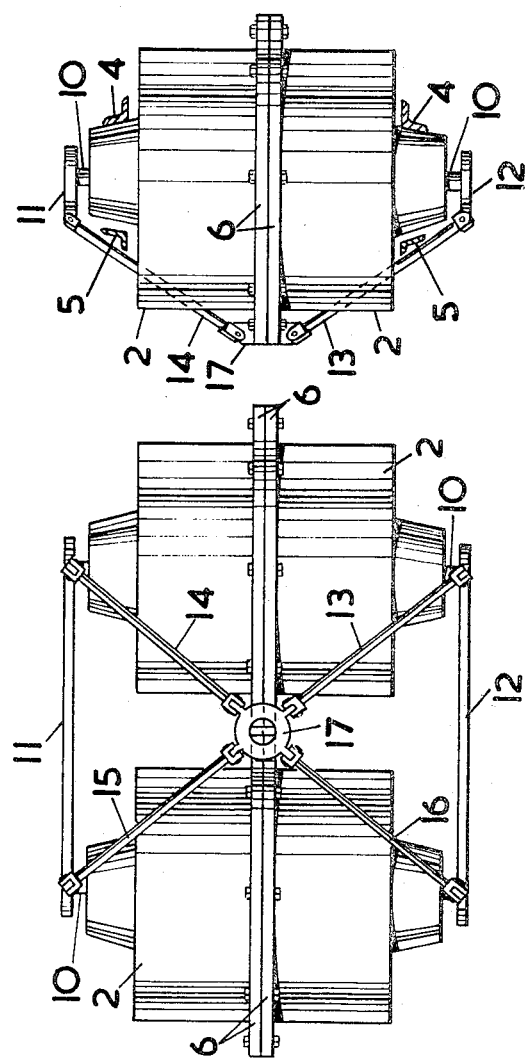

PASSIVE ROLL STABILISERS

This invention relates to passive roll stabilisers for reducing roll amplitudes in ships or other floating vessels. Although this invention can be used in ships or floating vessels of any size, it is more suitable for small craft.

Passive roll stabilising systems utilising a liquid such as water as a moving weight contained in a tank or tanks extending across the width of a vessel are well known. In such systems the moving weight is utilised to extract energy from the rolling vessel by arranging for the vessel to do work on the moving weight. As the rolling of the vessel is usually a harmonic one, a harmonic movement of the moving weight is produced which results in the system being self actuating.

It is also well known that it is desirable to arrange for the natural period of motion of a moving weight stabiliser system substantially to coincide with that of a vessel in which it is being used, in which condition the systems is said to be tuned. Also, for any damper to perform successfully it must at all times oppose the velocity and not the deflection of an oscillating body, thus ideally the moving weight on a rolling vessel should always be on the rising side of that vessel. At resonance there will be a quarter-cycle phase difference between the vessel and tuned moving weight motions, the moving weight lagging the vessel, giving precisely the conditions required for maximum energy extraction by the moving weight from the vessel.

Energy fed into a moving weight stabiliser system increases the amplitude of its oscillatory motions which if not damped would continue to increase indefinitely. In practice the amplitude of the weight displacement increases until the energy loss by a vessel to the moving weight system equals the energy gained from the sea by the vessel (less losses due to natural roll damping of the hull in the water). The moving weight system damping is thus the final sink into which energy gained from the sea by the vessel is damped. The amount of damping has to be adjusted to keep the amplitude of the moving weight within practical limits. In passive stabilisers utilising water as a moving weight, damping of the motion of water is brought about by turbulence and the breaking of waves. Additional damping may be readily provided by suitably shaping the inside of the tanks containing the water or by fitting obstructions of one sort or another within the tanks.

Hitherto liquids and particularly water have been found suitable as moving weights for passive stabilising systems for rolling vessels of large and medium size where space has been available for the bulk of water required. Further for large and medium sized vessels liquids have been and are likely to be considered more manageable than an equivalent moving solid weight which is more compact and therefore could be dangerous especially if it were to escape from its guidance system. However in small craft where a smaller moving weight is required, a solid moving weight is more attractive because of its compactness which saves space and enables it to generate a greater damping effect as its centre of gravity can move further from the ship's centre.

The behaviour of a solid moving weight for a passive stabilising system is required to be analogous to that of the bob of a pendulum which is suspendable by a suspension string of a length which permits it to oscillate at a period substantially equal to the natural period of a vessel to which it is fitted. The inconvenience of suspending the solid moving weight from a high point can be avoided in practice by using a curved track along which the solid weight can move in order to reproduce the path of an equivalent pendulum bob.

As in the case of water a solid movable weight which is free to move under the effects of gravity within a vessel would also reduce the static stability of the vessel. This is because as the vessel heels through a small angle the moving weight moves downwards and acts to oppose and hence reduce the static righting ability of the vessel. This loss of stability is usually represented as a reduction in the metacentric height of a vessel, and in cases where the metacentric height of a vessel is small in the first instance, any further loss due to the presence of a movable weight should be made as small as possible. One parameter which is of importance in the case of a solid movable weight in a vessel or other floating body is the distance that the movable weight is likely to move from the centre line of the vessel for a given angle of heel of the vessel. A pendulum analogy to the "free surface effect" for water is available for a movable solid body.

For static purposes the weight of a movable pendulum bob of mass $m$ can be considered as acting at all times through its point of suspension, i.e., at a height $l$ above the locus of the movable mass $m$. Statically therefore a vessel's stability can be regarded as being reduced by a weight $m g$ raised to a height $l$. The corresponding reduction in the metacentric height of the vessel of total displacement $\Delta$ will be $(m\ g\ l/\Delta)$. Thus in cases where the reduction in metacentric height due to the presence of a movable weight is required to be kept within strict limits for a ship of a given displacement, this can only be done by reducing the mass $m$ and/or the effective pendulum length $l$. From the point of view of the designer of a passive stabiliser any reduction in the mass $m$ of the movable weight would result in a reduction in the effectiveness of the stabiliser. Therefore from this point of view it is preferable to reduce the pendulum length $l$ of a movable solid weight stabiliser rather than its mass $m$ in order to control the loss of metacentric height. In practice the effective pendulum length $l$ could be controllable by altering the curvature of a track. However any reduction in the effective pendulum length of a movable weight would reduce its period which would not be desirable as it would result in the system becoming detuned in that the natural period of the movable solid weight would become shorter than that of the vessel on which it was installed.

An object of the present invention is to provide a passive roll stabiliser system utilising a mobile body made of solid material whereby a required period of oscillation of the system can be safely achieved despite using a heavier body than would normally be permitted by static stability requirements.

It is a further object of this invention to provide a compact damping means for dissipating energy extracted from a ship or other floating vessel by a solid mobile body made of solid material in a passive roll stabiliser system whereby excessive amplitudes of oscillation of the body are prevented. According to the present invention, there is provided a passive roll stabiliser system for a floating vessel comprising a guide-way defining a sagging arcuate track in a plane sustantially parallel to that in which the vessel rolls and a mobile body supported by the guide-way so as to undergo when the vessel rolls oscillatory motion to and fro along the guide-way which is subject to the effects of a combination of rotational and translational inertias such that the rotational energy of the system is greater than half its translational energy, the track of said guide-way being curved to a greater extent than the path of a pendulum having a natural resonant period equal to that of the rolling vessel to ensure a desired adequate static stability for the vessel, and energy damping means for dissipating energy gained by the mobile body from the vessel as it moves along the track.

As above described, it is desirable from safety considerations, to limit the effective pendulum length by limiting the curvature of the arc or locus of movement of the movable body, which in turn limits the period of motion of the body. The invention enables the period to be lengthened so that it can be tuned to the natural period of the ship in which it is installed without affecting the metacentric height, and does this by increasing the effective inertia of the moving body by utilising the rotational inertia of all or part of the body. The rolling body system may advantageously be designed to have a rolling inertia which provides a rotational energy greater than or even many times greater than its translational energy.

The rolling inertia of the system may be simply derived from the rotation of the solid body in rolling along or from a part of the solid body comprising a flywheel which is rotatable in response to the motion of the solid body. Alternatively, it may be derived from a separate body which is caused to rotate by virtue of motion of the solid body.

According to an important feature of the invention, damping means which are required for dissipating energy gained by the stabiliser system are housed within a part of the system providing at least a proportion of the rotational inertia. The damping means would be housed within the solid body itself if the solid body rolled along, alternatively damping means could be housed in the flywheel if a flywheel is part of a solid movable body. Where rotational inertia effects are derived from a separate body, the damping means would be housed within that separate body. In each case, housing damping means internally of rotating bodies provides a compact energy dissipating means.

In a simple form, the invention comprises a passive roll stabiliser system for a floating vessel comprising a body capable of motion to and fro along an arcuate path in a plane substantially parallel to the plane in which the vessel rolls wherein the body itself is arranged to roll about a rolling axis and which has at least one circular rolling surface on which the body rolls about its rolling axis along the track of the guide-way, the radius of the rolling surface being less than the radius of gyration of the complete body about its rolling axis. By the term "radius of the rolling surface" is meant the radius of that part of a body which rolls in contact with the track of a guide-way which bears the weight of the body. The radius of the rolling surface must then be less and may be considerably less than the maximum or main radius of the rolling body about its rolling axis.

If the body has a radius of gyration $k$ and a rolling radius $r$ the period of rolling upon a track having a radius of curvature $l$ is $$2\pi \sqrt{l/g} \cdot \sqrt{1 + (k^2/r^2)}.$$

The period of the system is thus lengthened in the ratio $$\sqrt{1 + k^2/r^2}$$

relative to the simple pendulum. Here both $k$ and $r$ are controllable.

According to a further aspect of the invention the solid body comprises a mass capable of rolling along on wheels, the mass being coupled by means of one or more belts and pulleys to a rotatable mass which is rotatable in response to the motion of the solid body, the rotatable mass being mounted either upon or separate from said solid body.

A movable solid body roll-damper, in the form of a sphere arranged to oscillate in an arcuatic passage filled with water or a more viscous liquid, was first proposed by Monsieur Crémieu in 1907 and was referred to on page 419 in a book entitled "The Design and Construction of Ships" Volume II by Professor J. H. Biles. A further proposal by M. Crémieu is available on page 210 of Volume 53 Part I of the 1911 Transactions of the Institution of Naval Architects in a discussion following a paper by H Frahm entitled "Results of Trials of the Anti-Rolling Tanks at Sea." In this second case a solid movable body on wheels was envisaged. In both proposals M. Crémieu failed to visualise the dangers of a free movable solid body to the static stability of a vessel. Hence the need to limit the effective pendulum length of the movable body for safety purposes whilst maintaining a suitable period of oscillation, which is the main objective of the present invention, was not appreciated in any way. It will further be appreciated that a sphere as proposed by M. Crémieu has a relatively low rolling inertia for its mass while the liquid in the passage within which the sphere was to move would tend to discourage rolling.

According to yet another aspect of this invention the mobile body is arranged to have a substantially cylindrical interior chamber, and a fluid-like substance which partially fills the chamber and slips or tumbles over as the body rolls along the track thereby dissipating energy gained by the mobile body from the rolling vessel. The term "fluid-like substance" is intended to include, in addition to liquids, particulate or granulated substances and preferably would comprise a substance such as lead shot or sand, the main prerequisite being that the damping material should be capable of moving in a fluid-like manner under gravitational forces.

According to a further aspect of this invention the mobile body comprises a plurality of bodies each having two circular collateral rolling surfaces on opposite sides of the body and on which the body rolls along the track of the guide-way, the diameter of the rolling surfaces being less than the mean cross-dimension of the main part of the body, and connecting means for interconnecting the said bodies in tandem so that they are constrained to roll in tandem with substantially the same translational velocities and with their axes of rotation substantially parallel.

The mobile body made of solid material is preferably arranged to move to and fro athwartships on one or more guide-ways such as a rail or track which is profiled such that the body will follow a locus corresponding to a desired movement of a pendulum bob. Such a guide-way enables a designer to depart from a circular locus. The conventional pendulum is isochronous for small angles of deflections; at larger angles of deflection the period becomes a function of amplitude. It is possible to compute shapes of tracks to give any desired period of oscillation of a movable weight as a function of its movement.

Two systems will now be described by way of example only with reference to the accompanying drawings wherein:

FIG. 1 is an athwartships sectional view of a ship, showing the location and locus of oscillation of the solid movable weight passive stabiliser.

FIG. 2 is part sectional view of the solid movable weight, removed from the ship for clarity, as would be seen looking in Section A—A in FIG. 1.

FIG. 3 is an athwartships view of a tandem-layout set of mobile weights shown without a ship or guide means for clarity.

FIG. 4 is a plan view of the set of movable weights shown in FIG. 3.

FIG. 5 is a front elevational view of the movable weights shown in FIG. 3 with tracks and safety rails shown.

Referring to the drawings, FIG. 1 shows a hull of a ship, 1, of any desired configuration. G is the centre of gravity of the ship, M is its metacentre and C is the effective pivotal point of a solid movable weight 2 when it is considered as an oscillating pendulum bob capable of to and fro rolling motion within a chamber 3 on a track 4 between positions I and III through position II, the weight 2 being shown in its static position II on the centreline of the ship.

FIG. 2 shows a safety rail 5 which is substantially parallel to track 4 which does not normally contact the solid movable weight 2. A further safety feature which assists centring of the movable weight is that its rolling surfaces 2a are conically shaped which assists in centring the rolling body as well as eliminating yawing motion of the weight as it rolls.

The rolling weight is constructed in two parts, 2b and 2c, which are clamped together by rings 6. The rolling inertia of the weight about axis X—X is controllable by distributing the mass of parts 2b and 2c as required together with varying the mass of the rings 6. The parts 2b and 2c are fashioned to form cylindrical chamber 7 in which a quantity of lead shot 8 is retained as damping means. When the weight rolls the lead shot is tumbled over and over in attempting to remain at the bottom of the chamber and energy is thereby extracted from the moving system. Although cast steel would be a preferred material for the parts of the moving weight, any other suitable material may be used.

In operation as the ship rolls, the movable weight will oscillate by rolling between positions I and III in response to the motion of the ship. The motion of the moving weight will lag behind the motion of the ship by around 90° when the natural period of the moving body is correctly adjusted to coincide with that of the ship.

During most sea voyages, a ship will seldom encounter a train of regular waves which excite it to roll at exactly its natural frequency. Therefore for most of the time the ship and consequently its moving weight stabiliser will not roll or oscillate at their maximum amplitudes. To ensure that a moving weight stabiliser behaves efficiently over the full range of sea conditions, it is necessary to arrange for the stabilizer weight to move as nearly as possible to its outermost positions I and III as often as possible, even when the ship is not rolling to extreme angles. The maximum amplitude of the movable weight in extreme conditions would then exceed the limits of movement of the track. Although such situations would normally be rare it is important that some further energy absorption means be provided to prevent the movable weight from crashing into the side of the ship in these circumstances. Such energy absorption means could comprise four-bar linkage systems where one of the linkages is usable as a brake shoe which is capable of acting progressively upon the movable weight near the extreme limits of its available traverse. Alternatively such energy absorbing means could comprise hydraulic dampers. An important property of such dampers is that the energy of the movable weight should be fully absorbed in the time that it would have normally taken the movable weight to reach the extreme limit of its normal swing had it been unhindered. Such auxiliary safety dampers are shown diagrammatically at 9 in FIG. 1. The following is a typical example of a design for a movable solid body passive stabiliser for a ship having the following characteristics:

Length, b.p. — = 117.5 feet
Breadth, mid — = 32 feet
Displacement — = 580 tons
Metacentric Height (GM) — = 2 feet
Roll Period of Ship — = 8.7 seconds From accommodation considerations, a track radius of 16 feet was available where the pivotable point C of the pendulum was 6.86 feet above the centre of gravity G of the ship, giving an outermost point of travel of 10.5 feet on either side of the centre line of the ship. The period of oscillation of a simple pendulum at this radius is 4.43 seconds. Hence the inertia factor $(1 + k^2/r^2)$ to extend the period of oscillation of a rolling weight to the required one would be $(8.7)^2/(4.43)^2 = 3.85$, hence $k/r$ is equal to 1.69. Selecting a movable weight of 7 tons it is then a simple matter to arrange for $k/r$ to equal the required amount for a solid body shape as shown in FIG. 2. This weight together with lead shot of 1 ton which is carried within the body as damping means would produce a static heel of 4.15°, which is an approximate measure of the wave slope/capacity of the movable body. The loss of metacentric height suffered by the ship however for the chosen movable weight and track radius will be only 0.1 foot which is acceptable from a stability point of view.

By way of comparison in order to illustrate the benefit of the present invention, if the weight slid instead of rolled, in order to achieve a period of 8.7 seconds, a track radius of 62 feet would be required. Assuming a track position at a similar height relative to the centre of gravity at the centre line of the vessel as in the example above, the pivotable point of the simple pendulum would be 54 feet above the centre of gravity of the vessel resulting in a loss of metacentric height of 0.75 foot which would be unacceptable from a stability point of view.

The mass of the movable weight may be distributed in a variety of ways in that the diameter and the width of the weight could be altered to suit the space available while maintaining a ratio of rotational to translational inertia such that the rotational energy of the stabilizer system is greater than half of the translational energy of the system.

FIGS. 3, 4 and 5 illustrate a tandem-layout set of movable weights 2, similar to that shown in FIGS. 1 and 2, which are connected together by means of a pin-jointed structure comprising members 11 to 17. The movable weights 2 are both fashioned to form cylindrical internal chambers, similar to that shown in FIG. 2, in which a quantity of movable shot is retained in order to damp any rolling motion of the weights. As in the case of the movabe weight disclosed in FIGS. 1 and 2, the weights in FIGS. 3, 4 and 5 are respectively formed in two halves which are clamped together by means of the rings 6. The mass of the rings 6 can be varied and thus used as a means of adjusting the rolling inertia of the weights about their respective rolling axes. The two movable weights 2 in FIGS. 3, 4 and 5 each have spindles 10 on their rolling axes to which the pin-jointed structure 11 to 17 can be connected.

The main object of the pin-jointed structure is to constrain the weights to move along a track 4 at substantially the same translational speed in a manner analogous to that of the single weight described with reference to FIGS. 1 and 2. The structure is preferably maintained as light as possible in order to minimise its contribution to the total translational inertia of the movable weights. Members 11 and 12 have to be strong enough to withstand longitudinal forces for which the impact against auxiliary safety dampers, such as those shown at 9 in FIG. 1, would probably provide the design case. In addition members 13, 14, 15 and 16 are convenient struts which are pin-jointed to a fitting 17. The members 13 to 16 ensure that the respective movable weights do not yaw relative to each other as they roll along the track 4. The structure should also provide a certain amount of tortional rigidity about the direction of motion of the weights. However, a safety rail 5 which is substantially parallel to track 4 may also be used. This safety rail will not normally contact the solid movable weights 2. In practice the structure could be arranged to be assembled onto the two movable weights after the weights have been placed in position upon the track 4. This would reduce the problem of handling both weights together.

We claim:

1. A passive roll stabiliser system for a floating vessel comprising a guide-way defining a sagging arcuate track in a plane substantially parallel to that in which the vessel rolls and a mobile body supported by the guide-way so as to undergo when the vessel rolls oscillatory motion to and fro along the guide-way and simultaneous rotation about a horizontal axis perpendicular to the plane of said track, said mobile body comprising at least one body which can roll about a rolling axis and which has at least one circular rolling surface on which the body rolls about its rolling axis along the track of the guide-way, the radius of the rolling surface being less than the radius of gyration of the mobile body about its rolling axis, such that the rotational energy of the system is greater than half its translational energy, the track of said guide-way being curved to a significantly greater extent than the path of a pendulum having a natural resonant period equal to that of the rolling vessel to ensure a desired adequate static stability for the vessel, and energy damping means for dissipating energy gained by the mobile body from the vessel as it moves along the track.

2. A stabiliser system according to claim 1 wherein the rotational energy of the said system is greater than its translational energy.

3. A stabiliser system according to claim 2 wherein the said mobile body comprises a single body having two circular rolling surfaces one on each side of the body.

4. A stabiliser system according to claim 3 wherein each of said rolling surfaces has a conical surface which decreases in diameter away from the centre of the body.

5. A stabiliser system according to claim 3 wherein the track of the guide-way comprises two arcuate rails, one for each rolling surface of the mobile body, each track having an upper supporting surface which is convex in a transverse direction.

6. A stabiliser system according to claim 3 wherein the mobile body has a substantially cylindrical interior chamber, and a fluid-like substance which partially fills the chamber and slips or tumbles over as the body rolls along the track thereby dissipating energy gained by the mobile body from the rolling vessel.

7. A stabiliser system according to claim 1 having damping means positioned at each of the two ends of the track of the guide-way for absorbing any residual energy in the mobile body as it reaches the end of the track.

8. A stabiliser system according to claim 8 wherein said damping means comprises a fluid-filled chamber, at least one piston part which can be driven back by the mobile body into the said chamber, and means for restoring the piston part to its original position when the body has moved away.

9. A stabiliser system according to claim 1 and wherein the mobile body comprises at least two individual mobile bodies interconnected in tandem, each individual body being capable of rolling along the track of the guide-way so that the total rotational energy of the system is greater than half its translational energy.

10. A stabiliser system according to claim 9 wherein at least one of the rolling bodies has a substantially cylindrical interior chamber, and a fluidlike substance which partially fills the chamber and slips and tumbles over as the body rolls along the track thereby dissipating energy gained by the mobile body from the rolling vessel.

11. A stabiliser system according to claim 9 wherein the rolling surfaces on at least one of said mobile bodies are conical with diameters which decrease away from the main part of the body.

12. A stabiliser system according to claim 10 wherein the track of the guide-way comprises two arcuate rails, one for each rolling surface of each mobile body, each track having an upper supporting surface which is convex in a transverse direction.

13. A passive roll stabiliser system for a floating vessel comprising a guide-way defining a sagging arcuate track in a plane substantially parallel to that in which the vessel rolls and a mobile body supported by the guide-way so as to undergo when the vessel rolls oscillatory motion to and fro along the guide-way and simultaneous rotation about a horizontal axis perpendicular to the plane of said track, said body being subject to the effects of a combination of rotational and translational inertias such that the rotational energy of the system is greater than half its translational energy, the track of said guide-way being curved to a greater extent than the path of a pendulum having a natural resonant period equal to that of the rolling vessel to ensure a desired adequate static stability for the vessel, and energy damping means for dissipating energy gained by the mobile body from the vessel as it moves along the track, said mobile body comprising a plurality of bodies each having two circular collateral rolling surfaces on opposite sides of the vertical plane through the centre of the body and on which the body rolls along the track of the guide-way, the radius of the rolling surfaces being less than the radius of gyration of the body, and connecting means for interconnecting the said bodies in tandem so that they are constrained to roll in tandem with substantially the same translational velocities and with their axes of rotation substantially parallel.

* * * * *

UNITED STATES PATENT OFFICE
CERTIFICATE OF CORRECTION

Patent No. 3,809,000            Dated May 7, 1974

Inventor(s) Anne Horsford et al.

It is certified that error appears in the above-identified patent and that said Letters Patent are hereby corrected as shown below:

Cover page, after item [21], insert
--[30] Foreign Application Priority Data
    Aug. 4, 1970 Great Britain 37528/70--.
Claim 8, line 1, "8" should read --7--.

Signed and sealed this 17th day of September 1974.

(SEAL)
Attest:

McCOY M. GIBSON JR.            C. MARSHALL DANN
Attesting Officer              Commissioner of Patents